United States Patent
Zlotnik et al.

(10) Patent No.: US 9,269,032 B2
(45) Date of Patent: Feb. 23, 2016

(54) GLASS-CONTAINING TRANSACTION CARD AND METHOD OF MAKING THE SAME

(71) Applicants: Lina Zlotnik, Greenwich, CT (US); Andrew A Joffe, Greenwich, CT (US)

(72) Inventors: Lina Zlotnik, Greenwich, CT (US); Andrew A Joffe, Greenwich, CT (US)

(73) Assignee: ZLOTECH LLC, Greenwich, CT (US)

( * ) Notice: Subject to any disclaimer, the term of this patent is extended or adjusted under 35 U.S.C. 154(b) by 278 days.

(21) Appl. No.: 13/788,138

(22) Filed: Mar. 7, 2013

(65) Prior Publication Data

US 2013/0248607 A1    Sep. 26, 2013

Related U.S. Application Data

(60) Provisional application No. 61/719,470, filed on Oct. 28, 2012.

(51) Int. Cl.
*G06K 19/06* (2006.01)
*G06K 19/02* (2006.01)
*B42D 25/00* (2014.01)

(52) U.S. Cl.
CPC ............... *G06K 19/02* (2013.01); *B42D 25/00* (2014.10); *Y10T 156/10* (2015.01)

(58) Field of Classification Search
CPC ... G06K 19/077; G06K 19/0771; B42D 1/001
USPC .......................................... 235/487, 488, 492
See application file for complete search history.

(56) References Cited

U.S. PATENT DOCUMENTS

| | | | | |
|---|---|---|---|---|
| 2007/0176622 A1* | 8/2007 | Yamazaki | ...................... | 324/770 |
| 2008/0251581 A1* | 10/2008 | Faenza | ...................... | B41M 3/14 |
| | | | | 235/435 |
| 2010/0025475 A1* | 2/2010 | Webb | ...................... | B41M 3/14 |
| | | | | 235/488 |
| 2013/0248607 A1* | 9/2013 | Zlotnik | ...................... | 235/488 |
| 2013/0320080 A1* | 12/2013 | Olson et al. | ...................... | 235/380 |

* cited by examiner

*Primary Examiner* — Daniel St Cyr
(74) *Attorney, Agent, or Firm* — King & Spalding LLP; Tim Smith

(57) ABSTRACT

A glass-containing transaction card and method of making the same are disclosed. In one embodiment, the glass-containing transaction card may be comprised of a plurality of substantially planar sheets having front and back surfaces bounded by a continuous peripheral edge, wherein at least one of the pluralities of substantially planer layers is comprise of a glass. In one embodiment, the glass layer of the transaction card may be a chemically strengthened glass selected from the group consisting of aluminosilicate, borosilicate, aluminoborosilicate and soda lime glasses. Preferably, the glass is aluminosilicate glass chemically strengthened by alkali metal ion-exchange. The glass-containing transaction card may further have other layers such as additional glass layers, polymeric materials, ceramic materials, metallic materials, or other glass materials and the like. The glass-containing transaction card may further have other layers comprising infrared-blocking materials detectable by an ATM and card assembly line.

27 Claims, 5 Drawing Sheets

GLASS-CONTAINING TRANSACTION CARD AND METHOD OF MAKING THE SAME

CROSS REFERENCE TO RELATED APPLICATIONS

The present application claims priority to U.S. Provisional Patent application No. 61/719,470, filed Oct. 28, 2012 and entitled "GLASS-CONTAINING TRANSACTION CARD AND METHOD OF MAKING THE SAME."

DESCRIPTION

Background

The present invention relates to transaction cards, such as credit cards, debit cards, ATM (Automated Teller Machine) cards, pre-paid cards, gift cards, charge cards and the like, that are used as substitutes for legal tender.

The vast majority of today's transaction cards are constructed of plastic, such as polyvinyl chloride (PVC) and polyethylene terephthalate (PET). However, these transaction cards are susceptible to being damaged or destroyed if exposed to damaging environments such as moisture and/or sunlight. In addition, such cards may be easily bent or may be broken or cut, thereby damaging the transaction card and rendering it unusable.

A small minority of the transaction cards on the market are constructed of metal- or carbon-based materials, such as titanium, carbon graphite or carbon fiber. Metal and/or carbon transaction cards are stronger and more durable in comparison with plastic transaction cards. But because these cards are far more expensive to produce due to the high material cost, they cannot replace plastic cards for the majority of transaction cardholders.

A need, therefore, exists for a transaction card that has enhanced strength and durability, greater rigidity, longer lifespan, enhanced feel and look and that can be cost-effectively produced for the majority of transaction cardholders.

The latest developments in glass technology including but not limited to Corning® Gorilla™ Glass, Corning® Willow™ Glass, Asahi Glass Co. Dragontrail™ Glass MIT Multifunctional Glass, significantly enhance the value of glass as a material for transaction cards. The present glass-containing transaction card is advantageously stronger and more durable than such plastic cards. In addition to these benefits, the present glass-containing transaction card is advantageously less expensive to produce and can be transparent or translucent in comparison with such metal and carbon cards. In addition to these benefits, the glass provides the card with a unique heft, look and feel. The card is thus more desirable for its distinctiveness over typical plastic, metal or carbon card and therefore allows bank or other institution offering glass-containing transaction card to attract more users, and thereby provide income to the institution as a result of card usage.

SUMMARY

The present invention relates to a glass-containing transaction card and a method of making the same, providing advantages including increased strength and durability, greater rigidity, longer lifespan, improved aesthetics, and other desirable features. The glass-containing transaction card comprises a substantially planar sheet having a front and back surfaces bounded by a continuous peripheral edge and a recordable medium for storing information relating to a transaction account. Preferably, the transaction card of the present invention has at least one layer of alkali-aluminosilicate glass. The glass-containing transaction card may be standard-sized i.e. about 3⅜ inches by about 2¼ inches or any other size usable as transaction card. The transaction card may have a magnetic strip, a signature panel, a holographic image, an embedded microchip, or any other feature typically contained on or within the transaction card.

A transaction card and a method of making the same are provided whereby the transaction card is comprised of at least one layer of glass. The at least one layer of glass provides durability, strength and rigidity to the transaction card. The one layer of glass may be any glass selected from the group consisting of aluminosilicate, borosilicate, aluminoborosilicate and soda lime glasses. Preferably, the at least one layer of glass is alkali-aluminosilicate glass.

Further, a transaction card having at least one layer of glass is provided whereby features and specifications of the transaction card i.e. physical dimensions, embossing area, issuer's identification, coding requirements, recording techniques etc. are compliant with the following International Standards Organization (ISO) standards for transaction cards: ISO 7810, ISO 7811, ISO 7812 and ISO 7813. The layer of glass in the transaction card may be transparent, translucent or opaque.

In addition, a transaction card having at least one layer of glass may further have other layers that include one or more layers such as polymeric materials or other glass materials and the like.

In addition, a transaction card having at least one layer of glass may further have other layers that include infrared-blocking materials detectable by an ATM and card assembly line.

BRIEF DESCRIPTION OF THE DRAWINGS

The preferred advantageous embodiments of the present glass transaction card will now be discussed in detail. The embodiments of the transaction card shown in the accompanying drawings are for illustrative purposes only and not for purposes of limiting same.

These drawings include the following figures, in which like numerals indicate like parts.

DETAILED DESCRIPTION OF THE PREFERRED EMBODIMENTS

The present invention will now be illustrated in greater detail with reference to the following examples. It is understood that the present invention is not limited thereto. For example, one skilled in the art will appreciate that in any of the examples the card may contain not transparent sections or may be not transparent and, therefore, card construction does not required infrared-blocking layer.

Figure 1A:
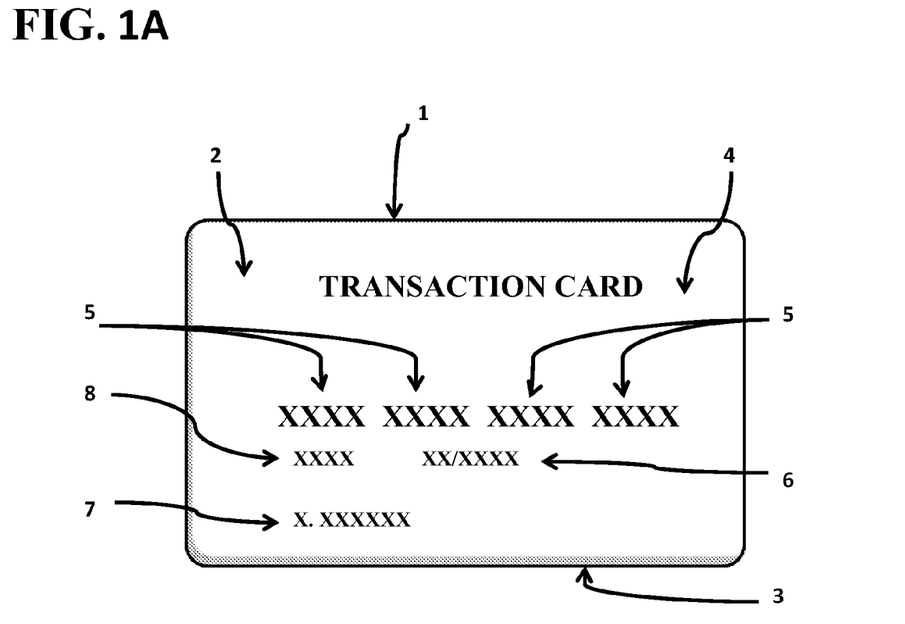
FIG. 1A is a front elevation view of one embodiment of the present glass-containing transaction card in accordance with an exemplary embodiment of the present invention.
Figure 1B:
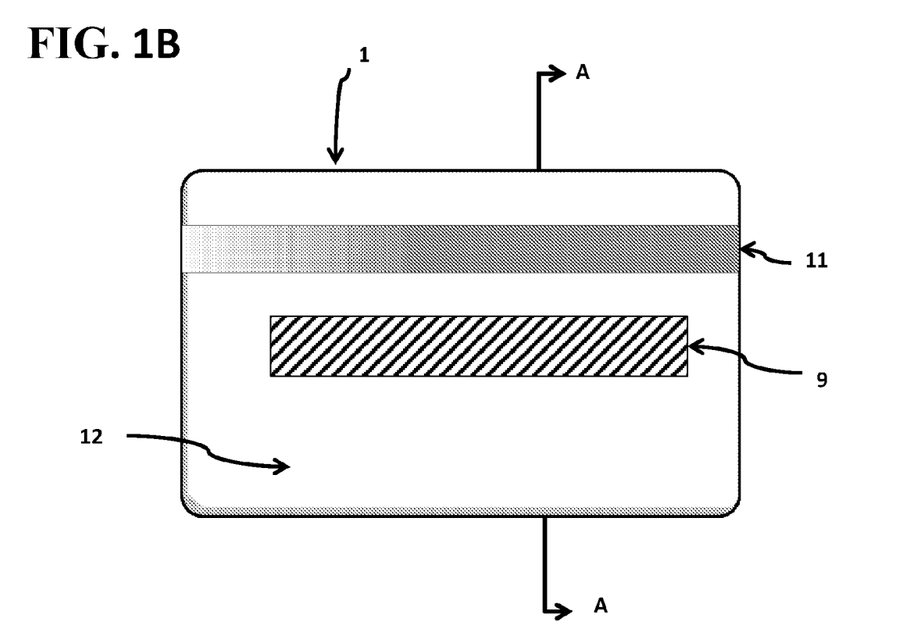
FIG. 1B is a rear elevation view of the glass-containing transaction card in accordance with an exemplary embodiment of the present invention.
Figure 2A:
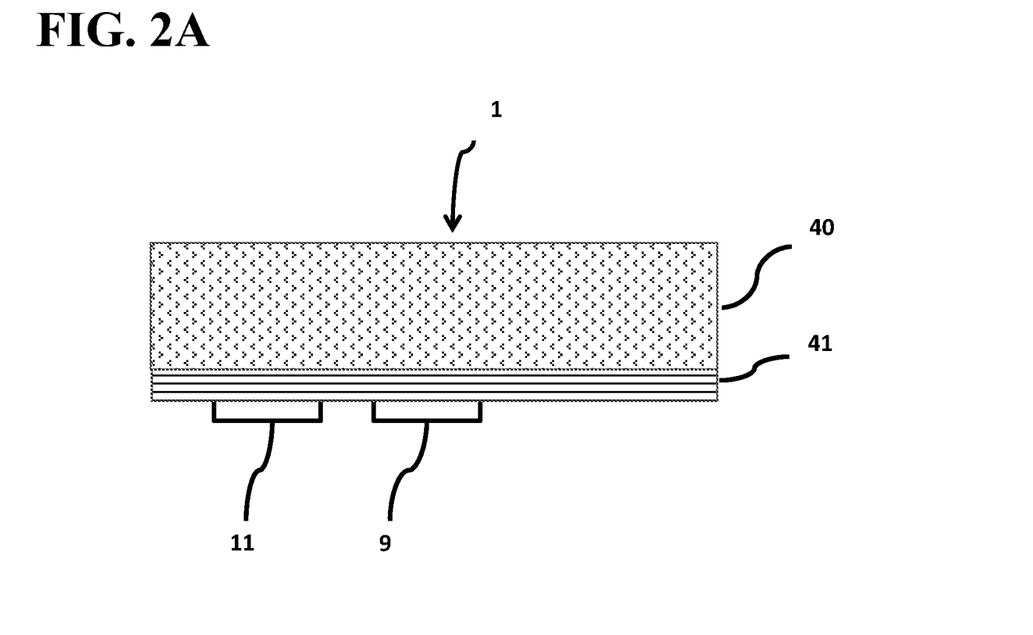
FIGS. 2A-2D illustrates various cross-sectional embodiments of glass-containing transaction card along line A-A of FIG. 1B.

Glass-containing transaction cards and methods of making the same are provided. With reference to FIGS. 1A-1B, the present transaction card 1 is a substantially planar sheet 2 having a front surface 4 and a back surface 12, and may be substantially rectangular as shown in FIG. 1 and FIG. 2. The card 1 includes a continuous peripheral edge 3. However, the present glass transaction card 1 could have virtually any shape usable as transaction card. The card 1 may be standard-sized, i.e., about 3⅜ inches by about 2¼ inches or any other size usable as a transaction card. With reference to FIG. 1A, the transaction card 1 bears a sixteen-digit identification number 5 associated with a particular account. It shall be understood by one of ordinary skill in the art that this identification number may vary in size and may be alphanumeric in nature.

The card 1 also bears the name 7 of the card holder, an expiration date 6, and the date 8 on which the card holder first acquired the card. The information displayed on the front surface 4 and/or the back surface 12 of the transaction card 1 may be embossed or laser etched to provide texture, images, alphanumeric characters, or the like.

With reference to FIG. 1B, the back surface 12 of the present transaction card 1 includes a magnetic strip 11 that stores information readable by a magnetic reader and signature panel 9. While not shown in FIGS. 1A-1B, other embodiments of the transaction card 1 may include additional features, such as embedded microchip, a holographic image, etc.

Figure 2B:
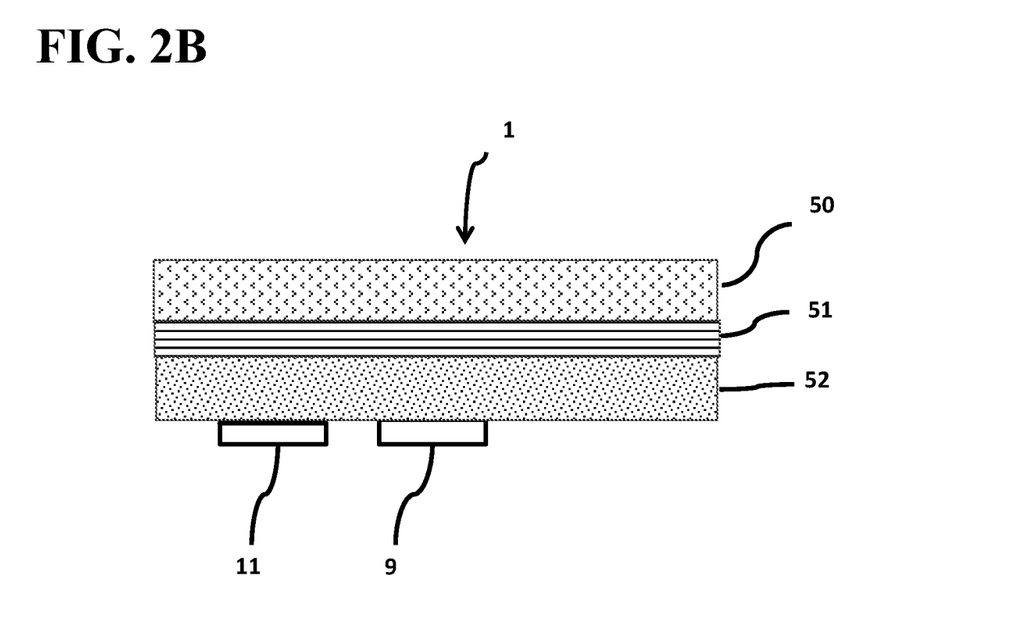
Figure 2C:
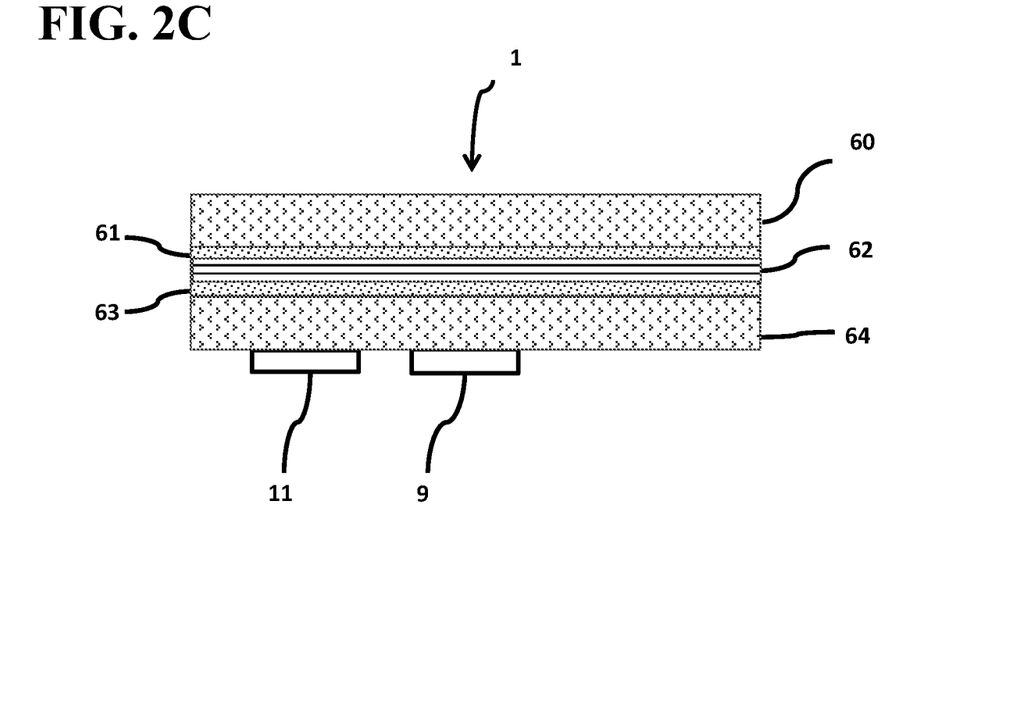
Figure 2D:
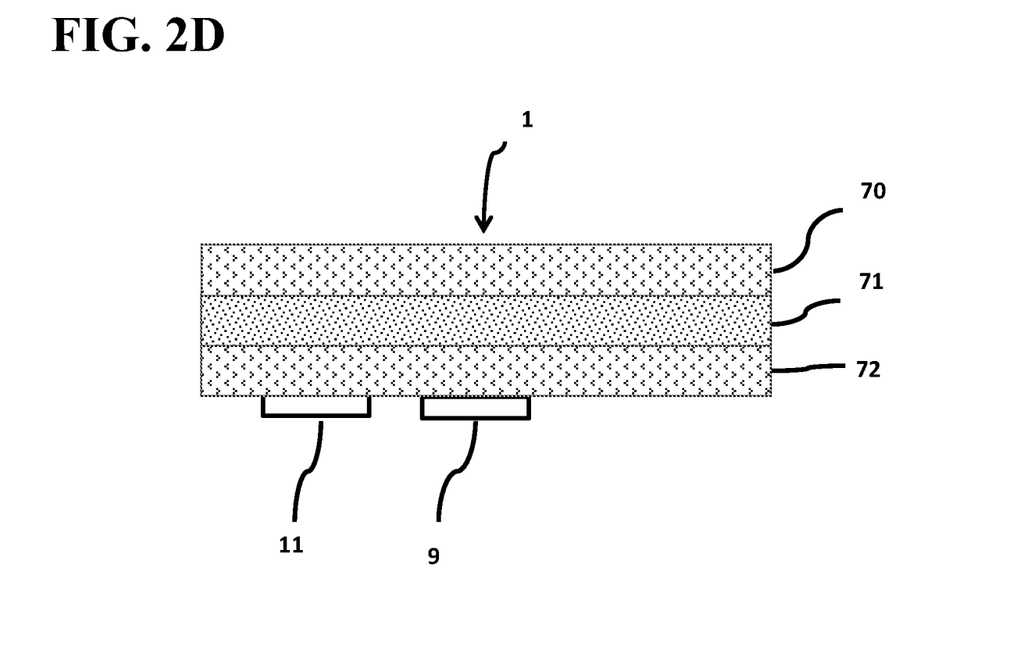

FIGS. 2A-2D, illustrates various cross-sectional embodiments of glass-containing transaction card 1 along line A-A of FIG. 1B whereby transaction card 1 is transparent or translucent, as shown in FIGS. 2A-2C, or opaque as shown in FIG. 2D. For purpose of the present description, a transparent transaction card will be understood to be a transaction card that transmits human-visible light (from 380 nm to 750 nm) without substantial scattering. A translucent transaction card will be understood to be a transaction card that transmits human visible light (from 380 nm to 750 nm) but with substantial light scattering. An opaque transaction card will be understood as blocking a substantial portion of incident light (transmission less than a percent) both in the visible (from 380 nm to 750 nm) and the infrared spectra (from 750 nm to 4,800 nm) via absorption, reflection or otherwise.

The transaction card's features are standardized under the International Standards Organization (ISO). The requirements and examples of transparent or translucent plastic transaction cards have been disclosed in, for example, U.S. Pat. No. 6,290,137 and U.S. Pat. Pub. No. 2012/0006902, each of which are herein incorporated by reference. The primary requirement of transparent or translucent glass-containing transaction card 1, with cross-sectional embodiments illustrated in FIGS. 2A-2C, in accordance with present invention is that it must transmit light in the visible light range of the electromagnetic spectrum (380-750 nm) with sufficient transmittance of at least about 40%. However, other transmittance level can be established in the visible spectrum (380-750 nm).

Another requirement, in accordance with present invention, is that glass-containing transaction card 1 must be detectable by ATMs, by transaction card embossing/encoding equipment, or by other automated card processing equipment. A typical light source utilized by card sensing devices used in ATM and various automated card processing equipment is an IRED (infrared emitting diode) having a wavelength in the range 750 nm-1200 nm. The typical spectral sensitivity range of the phototransistor sensor utilized by card sensing devices used in ATM and various automated card processing equipment is about 750 nm-1200 nm. Thus, visible light (380-750 nm) is not a part of digital-analog algorithm. The threshold opacity typically required for a financial transaction card to be detected by ATM and card processing equipment, in accordance with ISO 7810, clause 8.10, must be greater than 1.3 (less than 5% transmission) from 750 nm-950 nm and greater than 1.1 (less than 7.9% transmission) from 950 nm-1000 nm.

FIG. 2A illustrates a cross-sectional embodiments of the transaction card along line A-A of FIG. 1B. As shown, the transaction card 1 includes the transparent or translucent glass layer 40 and infrared-blocking transparent or translucent Low-Emissivity (low-E) layer 41. The infrared-blocking low-E layer 41 is utilized to allow transparent and/or translucent glass-containing transaction card 1 to be recognized by an optical card reader. Specific examples of such infrared-reflecting films have been disclosed in, for example, U.S. Pat. Nos. 6,461,731, 7,727,632 and U.S. Pat. Pub. No. 2012/0225317, each of which are herein incorporated by reference.

The infrared-blocking layer 41 of the transaction card 1, includes magnetic strip 11 and a signature panel 9 adhered directly to the layer 41. Preferably, the total thickness of the transactional card 1 including the glass layer 40 and the infrared blocking layer 41, as illustrated in FIG. 2A, is about 30 mils, however, the transactional card 1, may have other thicknesses. Preferably, the glass layer 40 is made of chemically strengthened glass selected from the group consisting of aluminosilicate, borosilicate, aluminoborosilicate and soda lime glasses and have sickness of about 30 mils, however, a glass layer 40 of the transactional card 1, may have other thicknesses. Preferably, the infrared-blocking low-E layer 41 is spatter-coated multilayer film, designed to reflect radiation above about 700 nm, with the following composition glass/SiNx/NiCr/Ag/NiCr/SiNx/DLC and sickness of about 150 nm as described in, for example, U.S. Pat. No. 6,461,731 nm herein incorporated by reference, however, an infrared-blocking multilayer film 41 of the transactional card 1, may have other compositions and/or other thicknesses.

FIG. 2B illustrates a cross-sectional embodiments of the transaction card along line A-A of FIG. 1B. As shown, the transaction card 1, includes transparent or translucent glass layer 50, the infrared-blocking transparent or translucent low-E layer 51 and transparent or translucent polymeric layer 52. The infrared-blocking low-E layer 51 is utilized to allow transparent and/or translucent glass-containing transaction card 1 to be recognized by an optical card reader. Specific examples of such infrared-reflecting films have been described in, for example, U.S. Pat. Nos. 6,461,731, 7,727, 632 and US Pat. Pub. No. 2012/0225317, each of which are herein incorporated by reference. The polymeric layer 52 of the transaction card 1, includes magnetic strip 11 and a signature panel 9 adhered directly to the layer 52. Preferably, the total thickness of the transactional card 1 including the glass layer 50, the infrared blocking layer 51, and the polymeric layer 52, as illustrated in FIG. 2B, is about 30 mils, however, the transactional card 1, may have other thicknesses. Preferably, the transparent or translucent glass layer 50 is made of chemically strengthened glass selected from the group consisting of aluminosilicate, borosilicate, aluminoborosilicate and soda lime glasses and have sickness of about 15 mils, however, a glass layer 50 of the transactional card 1, may have other thicknesses. Preferably, the infrared-blocking transparent or translucent low-E layer 51 is spatter-coated multilayer film, designed to reflect radiation above about 700 nm, with the following composition glass/SiNx/NiCr/Ag/NiCr/SiNx/DLC and sickness of about 150 nm as described in, for example, U.S. Pat. No. 6,461,731, herein incorporated by reference, however, an infrared-blocking multilayer film 51 of the transactional card 1, may have other compositions and/or other thicknesses. Preferably, the transparent or translucent polymeric layer 52 is made of PVB and has sickness of about 15 mils, however, polymeric layer 52 of the transactional card 1, may have other thicknesses.

FIG. 2C illustrates a cross-sectional embodiment of the transaction card along line A-A of FIG. 1B. As shown, the transaction card 1, includes the first transparent or translucent glass layer 60, the second transparent or translucent glass layer 64, and the infrared-blocking transparent or translucent multilayer polymeric compound comprising the first transparent or translucent polymeric layer 61, the infrared-blocking transparent or translucent interlayer 62, the second transparent or translucent polymeric layer 63. The infrared-blocking interlayer 62 is utilized to allow transparent or translucent glass-containing transaction card 1 to be recognized by an optical card reader. Specific examples of infrared-blocking polymeric multilayer films have been disclosed in, for example, U.S. Pat. No. 6,352,761 and U.S. Pat. Pub. No. 2012/0006902, each of which are herein incorporated by reference. The second glass layer 64 of the transaction card 1, includes magnetic strip 11 and a signature panel 9 adhered directly to the glass layer 64. Preferably, the total thickness of the transactional card 1 including the first glass layer 60, the second glass layer 64, and the infrared-blocking multilayer polymeric compound comprising the first polymeric layer 61, the infrared-blocking polymer interlayer 62, the second polymeric layer 63, as illustrated in FIG. 2C, is about 30 mils, however, the transactional card 1, may have other thicknesses. Preferably, the first glass layer 60 and the second glass layer 64 are made of chemically strengthened glass selected from the group consisting of aluminosilicate, borosilicate, aluminoborosilicate and soda lime glasses and have sickness of about 11 mils each, however, a first glass layer 60 and a second glass layer 64 of the transactional card 1, may have other thicknesses. Preferably, the first polymer layer 61 and the second polymer layer 63 are made of transparent or translucent PVB and infrared-blocking ink interlayer 62 comprised of nanocrystalline indium tin oxide particles. Preferably, the total thickness of infrared-blocking multilayer polymeric compound of the transactional card 1 including the first polymeric layer 61, the infrared blocking layer 62, and the second polymeric layer 63, as illustrated in FIG. 2C, is about 8 mils, however, an infrared-blocking multilayer polymeric compound of the transactional card 1, may have other thicknesses. An infrared-blocking compound may be a multilayer polymeric film manufactured by 3M Company (Minneapolis, Minn.), and has been disclosed in, for example, U.S. Pat. Nos. 5,882,774, 6,045,894 and 6,049,419, each of which are herein incorporated by reference. The multilayer polymeric film, manufactured by 3M, is either a birefringement dielectric multilayer film or an isotropic dielectric multilayer film designed to reflect radiation above about 700 nm.

FIG. 2D illustrates a cross-sectional embodiment of the transaction card along line A-A of FIG. 1B. As shown, the transaction card 1, includes the first transparent or translucent glass layer 70, the opaque polymeric layer 71 and the second transparent or translucent glass layer 72. The opaque polymeric layer 71 is utilized to allow transaction card 1 with two transparent or translucent layers of glass to be recognized by an optical card reader. The second glass layer 72 of the transaction card 1, includes magnetic strip 11 and a signature panel 9 adhered directly to the layer 72. Preferably, the total thickness of the transactional card 1 including the glass layer 70, the polymeric layer 71, and the second glass layer 72, as illustrated in FIG. 2D, is about 30 mils, however, the transactional card 1, may have other thicknesses. Preferably, the transparent or translucent glass layers 70 and 72 are made of chemically strengthened glass selected from the group consisting of aluminosilicate, borosilicate, aluminoborosilicate and soda lime glasses and have sickness of about 11 mils. Preferably, the opaque polymeric layer 72 is made of colored PVB and has sickness of about 8 mils.

While not shown in FIGS. 2A-2C, other embodiments of the transaction card 1 having at least one layer of glass may further have other layers that include one or more layers such as polymeric materials or other glass materials and the like. For example, outer layers of the card 1 may be polymeric while inner layers of the card 1 are glass, or vice versa. The percentage of glass or the number of glass layers in the card 1 may vary and may be up to 100%. The adaptive embodiments are not limited to any particular ratio or percentage of glass or the type and form of glass.

Figure 3A:
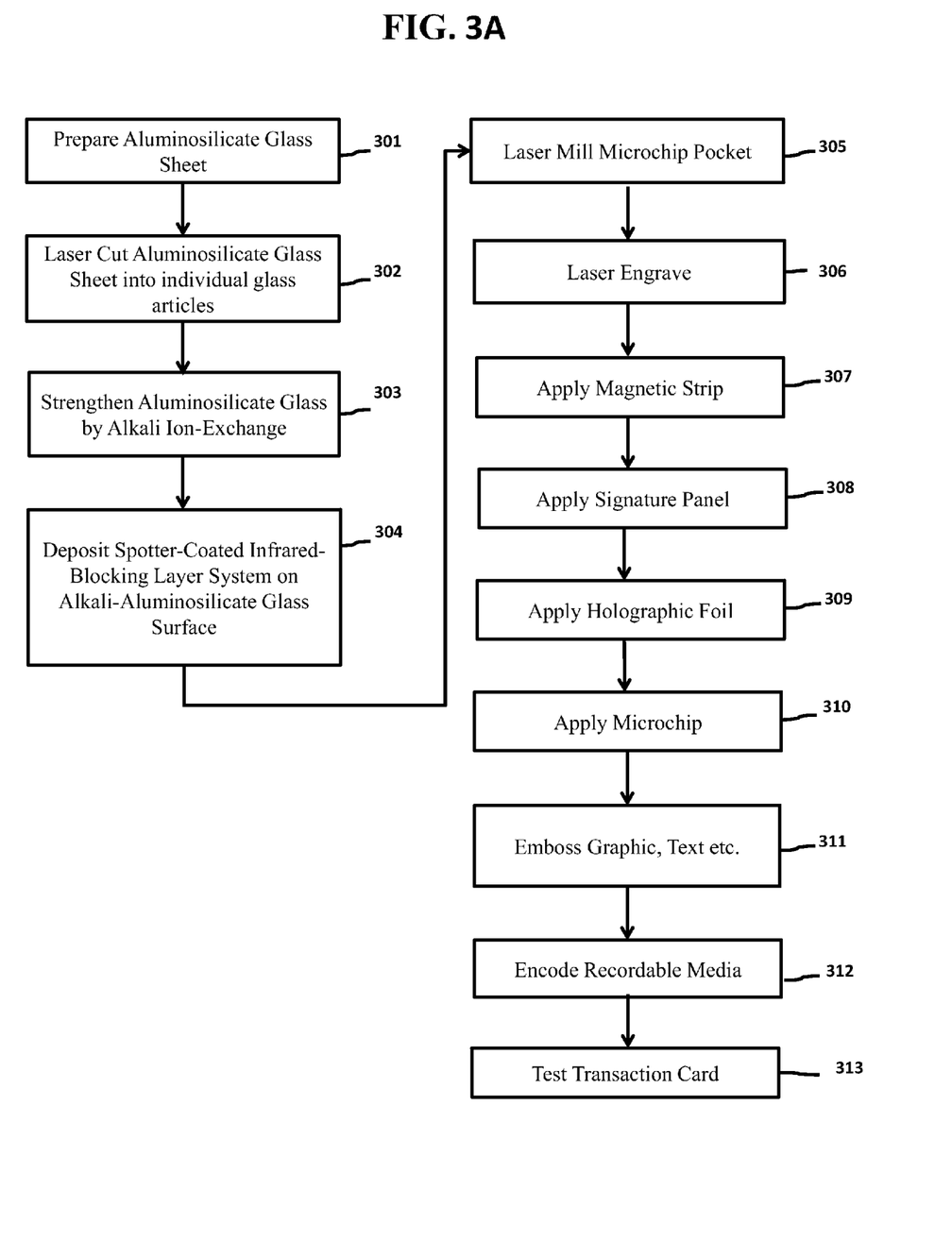
FIGS. 3A-3B illustrates various flow diagrams of the glass-containing card fabrication process in accordance with an exemplary embodiment of the present invention.

FIG. 3A illustrates a method 300 of making a glass-containing transaction card of the present invention, wherein the glass is aluminosilicate glass. Specifically, the method 300 includes a first step 301 of preparing the aluminosilicate glass sheet to form into transaction cards. Specifically a sheet of aluminosilicate glass may be prepared that is about 30 mils thick. Step 302, illustrates a cutting step whereby the sheet of aluminosilicate glass may be cut into individual transactional card shapes. The aluminosilicate glass sheet may be cut by a pulsed $CO_2$ laser. Methods for cutting glass substrates have been disclosed in, for example, U.S. Pat. No. 4,468,534 and U.S. Pat. Pub. Nos. 2008/0128953, 2010/0206008, 2010/0210442, and 2011/0049765, each of which are herein incorporated by reference. In step 303, the aluminosilicate glass articles may be strengthened by alkali ion exchange. The method of straightening glass articles by ion-exchange has been disclosed in detail in, for example, U.S. Pat. No. 3,790,430, herein incorporated by reference. Step 304 illustrates fabrication of infrared-blocking film. The structure, composition and fabrication procedure of the infrared-blocking multilayer films have been disclosed in, for example, U.S. patent application Ser. Nos. 08/402,201, 09/006,601, U.S. Pat. Pub. No. 2012/0006902, and U.S. Pat. Nos. 5,882,774, 6,045,894 and 6,049,419, each of which are herein incorporated by reference. Specifically spatter-coated multilayer film, with the composition glass/SiNx/NiCr/Ag/NiCr/SiNx/DLC may be prepared, as disclosed in, for example, U.S. Pat. No. 6,461,731, herein incorporated by reference, that is about 150 nm thick.

After individual aluminosilicate glass articles have been spatter-coated with infrared-blocking film in step 304, the transaction card may be milled via step 305 to provide a space for an embedded microchip for a smart card. The milling process may be done by laser micromachining. The process of laser micromachining of glass bodies was described in detail in, for example, U.S. Pat. Pub. No. 2010/0050692, herein incorporated by reference. The typical area required to embed microchip into the transaction card is about 20 to about 25 mils deep. The microchip may be applied to the milled pocket, and adhesive layer may be provided to secure microchip in said pocket. Step 306 illustrates individual transaction cards may be laser-engraved. The laser engraving may be done via commonly known laser-etching techniques to provide a graphic, images and text in one or both faces of the transaction card. Preferably, the laser-engraving in step 306, may be accomplished via a laser, such as, including but not limited to pulse $CO_2$ laser. Steps 307, 308 and 309 illustrate the application of a magnetic stripe, signature panel and holographic foil to the glass surface of the transaction card using adhesives or coating of thermoplastic. After applying magnetic stripe, signature panel and holographic foil to the surface of transaction card in the steps 307, 308 and 309, microchip may be applied to the milled area of the transaction card via step 310. The adhesive layer may be provided to secure microchip in to said milled area. The transaction card specific information including but not limited to Graphics and Text, may be embossed or laser etched via Step 311. Step 312, illustrates encoding of the transaction card. Any commonly used encoding techniques used to encode the transaction cards can be applied. The magnetic strip and/or the microchip may be encoded to provide transaction card with information contained within recordable area. The recordable media may be read via a magnetic stripe reader or a microchip reader. Finally, the recordable media and infrared optical card reader detection of the transaction card may be tested via Step 313.

Figure 3B:
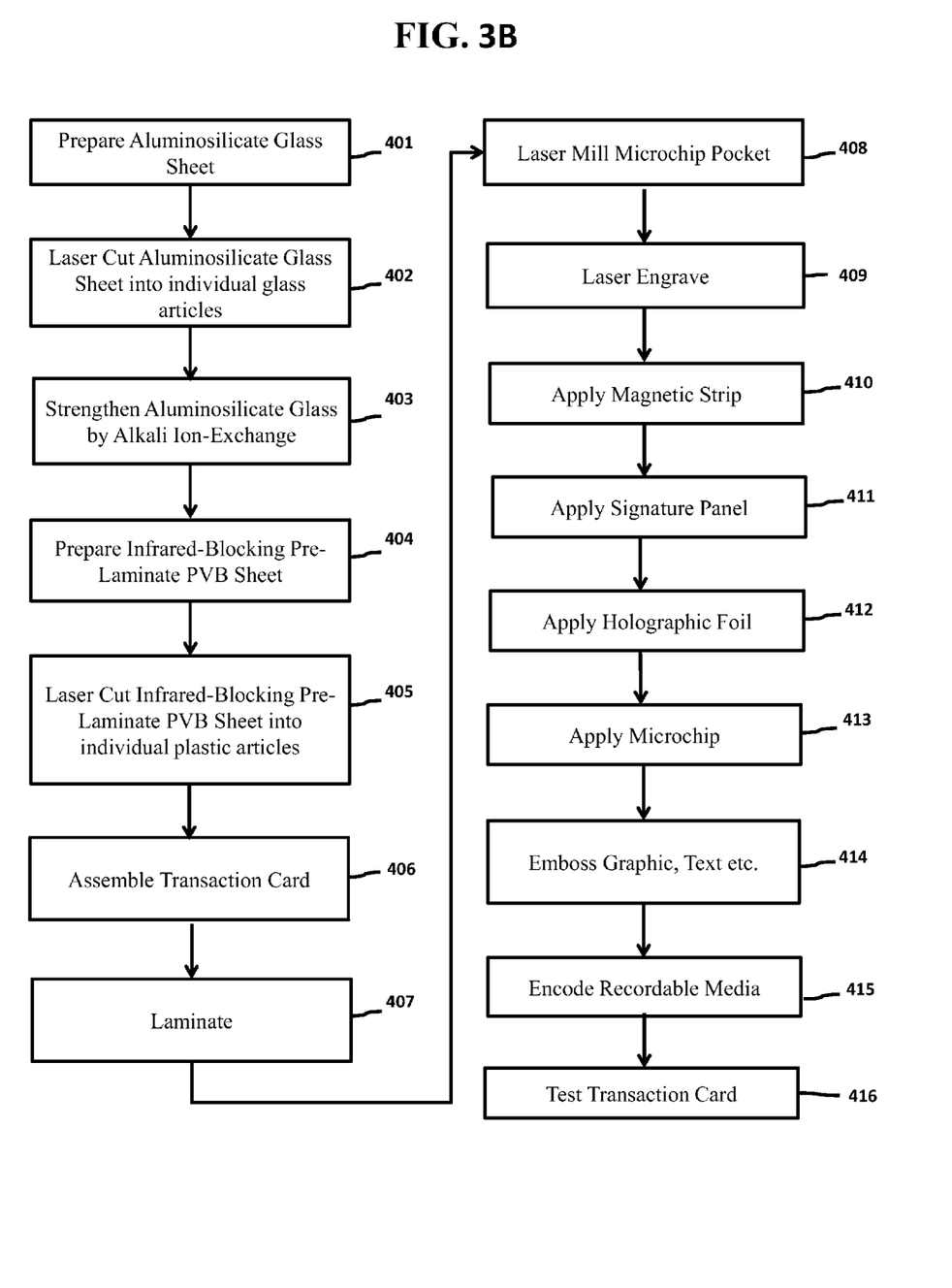

FIG. 3B illustrates a method 400 of making a glass-containing transaction card of the present invention, wherein the glass is aluminosilicate glass. Specifically, the method 400 includes a first step 401 of preparing the aluminosilicate glass sheet to form into transaction cards. Specifically a sheet of aluminosilicate glass may be prepared that is about 11 mils thick. Step 402, illustrates a cutting step whereby the sheet of aluminosilicate glass may be cut into individual transactional card shapes. The aluminosilicate glass sheet may be cut by a pulsed $CO_2$ laser. Methods for cutting glass substrates have been disclosed in, for example, U.S. Pat. No. 4,468,534, and U.S. Pat. Pub. Nos. 2008/0128953, 2010/0206008, 2010/0210442, and 2011/0049765, each of which are herein incorporated by reference. In the step 403, the aluminosilicate glass articles may be strengthened by alkali ion exchange. The method of straightening glass articles by ion-exchange is described in details in, for example, U.S. Pat. No. 3,790,430, herein incorporated by reference. Step 404 illustrates fabrication of infrared-blocking pre-laminate polymer layer. The structure and composition of the infrared-blocking pre-laminate polymer layer was discussed earlier and have been disclosed in, for example, U.S. patent application Ser. Nos. 08/402,201, 09/006,601, U.S. Pat. Pub. No. 2012/0006902, and U.S. Pat. Nos. 5,882,774, 6,045,894 and 6,049,419, each of which are herein incorporated by reference. Specifically a sheet of transparent PVB pre-laminate with embedded infrared-blocking ink interlayer may be prepared that is about 8 mils thick. Step 405, illustrates a cutting step whereby a sheet of transparent multilayered PVB pre-laminate with embedded infrared-blocking ink interlayer may be cut into individual transaction card shapes. While not shown in the FIG. 3B, the fabrication of polymer layer illustrated by Step 404 of card fabrication method 400, may include a preparation of opaque colored PVB pre-laminate sheet that is about 8 mils thick. Step 406, illustrates assembling of the transaction card pre-laminate stack comprises the first chemically strengthened aluminosilicate glass layer, transparent infrared-blocking PVB interlayer and the second chemically strengthened aluminosilicate glass layer. Step 407 illustrates lamination process, whereby the stack of two chemically straitened aluminosilicate glass layers separated by infrared-blocking transparent PVB interlayer are adhered together via heat and pressure. For PVB, the lamination temperature could be about 140° C. The process of lamination of chemically straitened glass was described in detail in, for example, U.S. Pat. App. No. 2012/0094084, herein incorporated by reference.

After individual aluminosilicate glass articles have been laminated in the step 407, the transaction card may be milled via step 408 to provide a space for an embedded microchip for a smart card. The milling process may be done by laser micromachining. The process of laser micromachining of glass bodies was described in detail in, for example, U.S. Pat. App. No. 2010/0050692, herein incorporated by reference. The typical area required to embed microchip into the transaction card is about 20 to about 25 mils deep. The microchip may be applied to the milled pocket, and adhesive layer may be provided to secure microchip in said pocket. Step 409 illustrates individual transaction cards may be laser-engraved. The laser engraving may be done via commonly known laser-etching techniques to provide a graphic, images and text in one or both faces of the transaction card. Preferably, the laser-engraving in step 309, may be accomplished via a laser, such as, including but not limited to pulse $CO_2$ laser. Step 410, 411 and 412 illustrates applying magnetic stripe, signature panel and holographic foil to the glass surface of the transaction card using adhesives or coating of thermoplastic. After applying magnetic stripe, signature panel and holographic foil to the surface of transaction card in the steps 410, 411 and 412, microchip may be applied to the milled area of the transaction card via step 413. The adhesive layer may be provided to secure microchip in to said milled area. The transaction card specific information including but not limited to Graphics and Text, may be embossed or laser etched via Step 414.

Step 415, illustrates encoding of the transaction card. Any commonly used encoding techniques used to encode the transaction cards can be applied. The magnetic strip and/or the microchip may be encoded to provide transaction card with information contained within recordable area. The recordable media may be read via a magnetic stripe reader or a microchip reader. Finally, the recordable media and infrared optical card reader detection of the transaction card may be tested via Step 416.

The invention claimed is:

1. A transaction card associated with a user account and used for financial transactions, the transaction card comprising:
    a plurality of substantially planar sheets having front and back surfaces bounded by a continuous peripheral edge; and
    a recordable medium for storing information relating to a transaction account, wherein the recordable medium comprises a microchip;
    wherein a first outer-most layer and a second outer-most layer of the plurality of substantially planar sheets comprises a glass material,
    wherein at least one of the plurality of substantially planar sheets comprises a pocket in which the microchip is embedded,
    wherein at least one of the plurality of substantially planar sheets comprises an infrared-blocking layer recognizable by an optical card reader, and
    wherein the infrared-blocking layer covers an inner surface of at least one selected from a group consisting of the first outer-most layer and the second outer-most layer.

2. The transaction card of claim 1, wherein the glass material comprises a chemically strengthened glass sheet selected from at least one of a group consisting of aluminosilicate, borosilicate, aluminoborosilicate and soda lime glasses.

3. The transaction card of claim 1, wherein the infrared-blocking layer comprises a multilayer transparent or translucent low-E coating.

4. The transaction card of claim 3, wherein the infrared-blocking layer comprises a multilayer film, wherein the multilayer film is spotter-coated to an inner surface of one selected from a group consisting of the first outer-most layer and the second outer-most layer.

5. The transaction card of claim 1, wherein the infrared-blocking layer comprises a transparent or translucent multilayer polymer sheet, comprising an infrared-blocking ink interlayer.

6. The transaction card of claim 5, wherein the infrared-blocking layer is laminated to an inner surface of at least one selected from a group consisting of the first outer-most layer and the second outer-most layer.

7. The transaction card of claim 1, wherein the infrared-blocking layer comprises an opaque polymer sheet.

8. The transaction card of claim 1, wherein the recordable medium further comprises a magnetic stripe disposed on an outer surface of the first outer-most layer or the second outer-most layer of the transaction card.

9. The transaction card of claim 1, further comprising a signature panel disposed on an outer surface of the first outer-most layer or the second outer-most layer of the transaction card.

10. The transaction card of claim 1, further comprising a pattern etched into the glass material.

11. The transaction card of claim 10, wherein the pattern is etched by a laser beam.

12. The transaction card of claim 1, further comprising a holographic image deposed on an outer surface of the first outer-most layer or the second outer-most layer of the transaction card.

13. A method of constructing a transaction card, the method comprising:
associating the transaction card with a user account;
including in the transaction card a recordable medium for storing information related to the user account, wherein the recordable medium comprises a microchip; and
constructing the card by assembling a plurality of substantially planar sheets having front and back surfaces bounded by a continuous peripheral edge;
wherein a first outer-most layer and a second outer-most layer of the plurality of substantially planar sheets comprises a glass material,
wherein at least one of the plurality of substantially planar sheets comprises a pocket in which the microchip is embedded,
wherein at least one of the plurality of substantially planar sheets comprises an infrared-blocking layer recognizable by optical card reader, and
wherein the infrared-blocking layer covers an inner surface of at least one selected from a group consisting of the first outer-most layer and the second outer-most layer.

14. The method of claim 13, wherein the glass material comprises a chemically strengthened glass sheet selected from at least one from a group consisting of aluminosilicate, borosilicate, aluminoborosilicate and soda lime glasses.

15. The method of claim 13, wherein the infrared-blocking layer is multilayer transparent or translucent low-E coating.

16. The method of claim 15, wherein the infrared-blocking layer comprises a multilayer film, wherein the multilayer film is spotter-coated to an inner surface of one selected from a group consisting of the first outer-most layer and the second outer-most layer.

17. The method of claim 13, wherein the infrared-blocking layer is a transparent or translucent multilayer polymer sheet, comprising an infrared-blocking ink interlayer.

18. The method of claim 17, wherein the infrared-blocking layer is laminated to an inner surface of at least one selected from a group consisting of the first outer-most layer and the second outer-most layer.

19. The method of claim 13, wherein the infrared-blocking layer comprises an opaque polymer sheet.

20. The method of claim 13, wherein the recordable medium further comprises a magnetic stripe disposed on an outer surface of the first outer-most layer or the second outer-most layer of the transaction card.

21. The method of claim 13, wherein the transaction card further comprises a signature panel disposed on an outer surface of the first outer-most layer or the second outer-most layer of the transaction card.

22. The method of claim 13, further comprising etching a pattern into the glass material.

23. The method of claim 22, wherein the pattern is etched by a laser beam.

24. The method of claim 13, wherein the transaction card further comprises a holographic image deposed on an outer surface of the first outer-most layer or the second outer-most layer of the transaction card.

25. The transaction card of claim 1, wherein the glass material is transparent or translucent.

26. The method of claim 13, wherein the glass material is transparent or translucent.

27. A transaction card associated with a user account and used for financial transactions, the transaction card comprising:
a plurality of substantially planar sheets having front and back surfaces bounded by a continuous peripheral edge; and
a recordable medium for storing information relating to a transaction account, wherein the recordable medium comprises a microchip;
wherein a first outer-most layer and a second outer-most layer of the plurality of substantially planar sheets comprises a glass material,
wherein at least one of the plurality of substantially planar sheets comprises a pocket in which the microchip is embedded,
wherein at least one of the plurality of substantially planar sheets comprises an infrared-blocking layer recognizable by an optical card reader,
wherein the infrared-blocking layer comprises a multilayer transparent or translucent low-E coating, and
wherein the infrared-blocking layer comprises a multilayer film, wherein the multilayer film is spotter-coated to an inner surface of one selected from a group consisting of the first outer-most layer and the second outer-most layer.

* * * * *